United States Patent [19]
Lowry et al.

[11] 3,872,194

[45] Mar. 18, 1975

[54] PROCESS FOR PRODUCING A BULK CUSHIONING MATERIAL

[75] Inventors: Robert D. Lowry; John W. Harrison, both of Winchester, Mass.

[73] Assignee: W. R. Grace & Co., Duncan, S.C.

[22] Filed: Sept. 30, 1970

[21] Appl. No.: 76,723

[52] U.S. Cl.............. 264/22, 264/210, 264/230, 264/284, 264/342
[51] Int. Cl............. B29d 7/02, B29d 7/24
[58] Field of Search ............ 264/230, 342, 22, 210, 264/286, 287, 284, 293, 90

[56] References Cited
UNITED STATES PATENTS

| | | | |
|---|---|---|---|
| 2,168,651 | 8/1939 | McCoy | 264/230 |
| 2,849,752 | 9/1958 | Leary | 264/220 X |
| 2,896,692 | 7/1959 | Villoresi | 264/287 |
| 2,902,718 | 9/1959 | Martelli | 264/90 |
| 2,986,777 | 6/1961 | Carter | 264/101 |
| 3,072,961 | 1/1963 | Gilbert | 264/90 |
| 3,324,217 | 6/1967 | Armstrong | 264/210 R |
| 3,328,505 | 6/1967 | Spencer | 264/284 X |
| 3,370,112 | 2/1968 | Wray | 264/22 |
| 3,376,238 | 4/1968 | Gregorian | 264/230 X |
| 3,562,048 | 2/1971 | Loew | 264/210 |
| 3,611,669 | 10/1971 | Shepherd | 264/230 X |

FOREIGN PATENTS OR APPLICATIONS

| | | | |
|---|---|---|---|
| 40-16076 | 9/1965 | Japan | 264/210 R |

Primary Examiner—Richard R. Kucia
Attorney, Agent, or Firm—John J. Toney; William D. Lee, Jr.

[57] ABSTRACT

A bulking material is produced by providing a substantially flat sheet of plastic material with a memory of a variation, such as an embossed pattern, in surface or bulk, therein and treating this sheet to bring about the substantial return of the remembered irregularities.

5 Claims, 11 Drawing Figures

3,872,194

INVENTORS:
ROBERT D. LOWRY
JOHN W. HARRISON
BY Edward J Hanson Jr
ATTORNEY

PROCESS FOR PRODUCING A BULK CUSHIONING MATERIAL

BACKGROUND OF THE INVENTION

This invention relates to bulk materials and more particularly to bulk materials having a reduced bulk phase.

The present invention is of particular value in providing a bulky packaging material that may be used in cushioning items during shipment and the like. The bulking packaging material may be shipped and stored in its non-bulk form thus providing an advantage over the prior art of being non-bulked or substantially non-bulked for shipment and storage and readily transformed into a bulk form at the desired packaging stage.

In the past plastic materials have been used as cushioning medium in packaging articles. For example, U.S. Pat. Nos. 3,218,178; 3,392,081 and 3,405,020, but these materials lack the advantage of being shippable and storable in a substantially unbulked form that can be expeditiously converted at the cite of packaging into a bulk form.

SUMMARY OF THE INVENTION

By an aspect of the invention a process is provided for handling bulking material. A substantially flat sheet of plastic is produced having a memory of a variation in surface, such as a repeating pattern, therein. This sheet of material is treated to bring about the substantial return of the remembered irregularities.

In its preferred form the sheet is formed from a cross-linked polymeric material such as polyethylene which was preferably cross-linked by irradiation to lock in the memory. The variation or pattern in the surface thereof is formed prior to cross-linking and after cross-linking the patterned sheet is stretched at the plastic's orientation temperature and held in stretched condition until set by cooling below said orientation temperature.

By another aspect of my invention a sheet of plastic is provided having a memory of a variation in surface. This variation in surface remembered by the plastic sheet is substantially reproducible by subjecting the plastic sheet to treatment.

In preferred forms the plastic sheet contains cross-linked polymer that has been oriented and frozen in its oriented condition with the memory of its former condition retained therein and expressible upon subjecting the sheet to a heat treatment.

By a further aspect of my invention a method of packaging goods is provided. The method includes taking a substantially flat, sheet material of plastic with a memory of a bulking variation therein and treating the sheet to bring about the substantial return of the bulking variation. The packaged goods are partially covered with the sheet to protect them.

In preferred forms the sheet material may be wrapped about the goods prior to the bulking treatment or packed in the sheet material prior to bulking treatment. The preferred bulking treatment involves heating the sheet material.

Accordingly, it is an object of this invention to provide a new means of bulk material. It is another object of this invention to provide a means for packaging, protecting and cushioning items that is expeditious in character, handling, storage and use. A further object is the provision of and handling of a sheet of plastic with a memory of a variation in contour therein.

In the illustrative examples there are employed sheets of low density polyethylene having a density of 917, a melt index of 2 and a melting point of 104°C. Many other polymers lend themselves to very advantageous use in this invention. Generally those that lend themselves to being cross-linked readily are more suitable.

The sheets unbulked have a thickness of about 2 mils and a bulk thickness of about from 45 to 60 mils. The sheets are irradiated after embossing to an extent of 12 megarads and stretched 4:1 in each direction.

Figure 1:
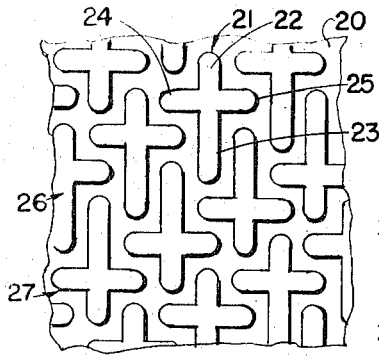
FIGS. 1, 2 and 3 are top plan views of alternative patterned bulked sheets of this invention.
Figure 2:
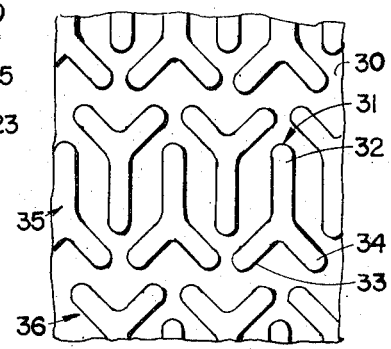
Figure 3:
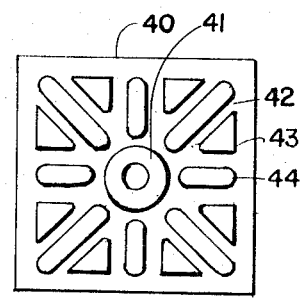
Figure 4:
FIGS. 4 and 5 are vertical sections through any one of the patterned sheets of FIGS. 1, 2 and 3 illustrating an alternative depth of patterning.
Figure 5:
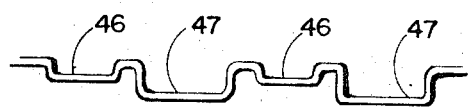

Referring now to FIGS. 1, 2 and 3, three sheets of patterned bulk polyethylene with three different patterns thereon which give particularly good results are shown. FIGS. 4 and 5 illustrate that a patterned sheet may have a surface having patterns of varying depths. FIG. 1 shows a sheet 20 having a repeating pattern of grooves, embossments or deformations in the form of a plurality of crosses 21, each of which has a short extension 22, a long extension 23 and two opposing arms 24 and 25. It may be seen that by having every other diagonal row 26 reversed to the adjacent diagonal row 27 a very close formed bulking pattern may be achieved which provides a good bulking quality with little non-bulked protective area. Thus the sheet 20 provides a substantially continuous surface variation to cushion packaged items.

The patterning of FIG. 2 is quite similar to the patterning of FIG. 1. In both of these patterns one of the advantages is that the repetition of a pattern by embossing or vacuum forming on rollers in a continuous sheet may be expeditiously accomplished using roll embossing or vacuum forming mechanisms in an inline manufacturing arrangement as shall be further described hereinafter. The Y's of FIG. 2 can be seen to provide a good bulking coverage. Each $Y^{31}$ has a long extension 32 with two short arms or extensions 33 and 34 branching from one end. In each row 35 and 36 every other Y is directed in the opposite direction and every row is offset with respect to the adjacent row so that each branching end of a Y is directed to receive two adjacent arms of adjacent Y's in the adjacent row.

Another pattern arrangement for bulking the sheet may be seen in FIG. 3. This type of pattern has particular utility for an item that is to be centered with respect to a particular dimension of sheeting. For example, in sheet 40 the center designation embossment 41 may indicate a centering position with the outer embossments 42, 43 and 44 forming the remainder of the pattern in repetition so that the entire circumference of an item being packaged can be protected.

Looking for a moment more particularly at FIGS. 4 and 5 it may be seen that even in the sheeting of, for example, FIG. 1 the embossments may be of even depth as shown in FIG. 4 at 45 or of uneven variation as indicated by depths or variations 46 in FIG. 5 and the more extreme offset variations 47.

Figure 6:
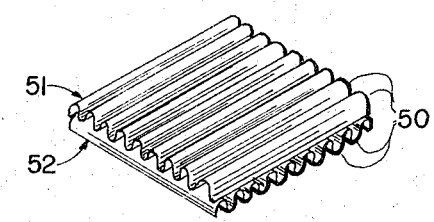
FIG. 6 is a perspective view of another alternative form of my invention showing a composite sheet.
Figure 11:
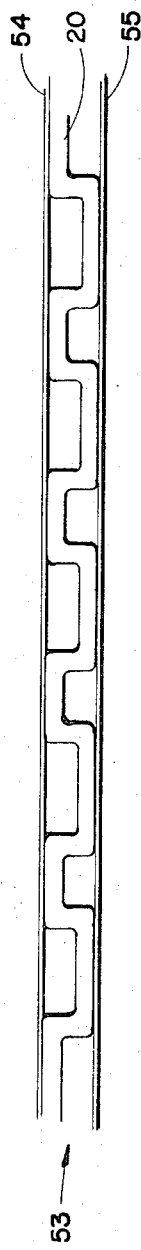
FIG. 11 is a perspective view of another form of my invention showing a composite sheet.

In another specie of this invention a sheet of bulking material may be bulked in the form of repeating waves 50 which extend in one direction parallel to one another as shown in FIG. 6 and then the sheet may be cut and a portion thereof sealed to itself with the waves running at 90° to form a grid and a composite sheet having double thickness. Of course, the sheets 51 and 52 that are shown sealed together with the waves crossing at an angle of 90° could be sealed together with the waves running at some other angle. The sheets could be connected wherever they will be in contact or only at their outer edges. In another form the sheets may be sealed together in flattened form with sufficiently weak adhesion to allow them to pull apart where they separate yet with sufficient strength of adhesion to hold them together where the separating forces are proportionally low. In any event it is contemplated that the sheets would usually be connected into a single unitary member or laminated sheet prior to being treated to bring about the substantial return of the remembered variations. Also, it is within the purview of my invention to interconnect sheets of other patterns or in certain instances to interconnect sheets having a remembered variation with sheets or a thin film having no remembered surface variation but usually one that will have corresponding overall dimensional adjustment such as by, for example, shrinking so that it will not be distorted when the sheet having the remembered variation is returned to its remembered form. Looking at FIG. 11 a laminate 53 is shown in which sheet 20 of FIG. 1 forms the intermediate ply and two outer plys are formed of two ordinary polyethylene film sheets 54 and 55.

Figure 7:
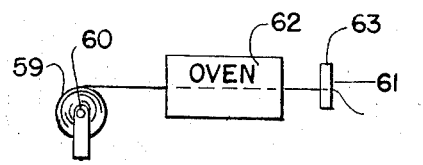
FIG. 7 is a diagrammatic illustration of a process for handling the bulking material of this invention.
Figure 8:
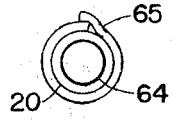
FIG. 8 is a diagrammatic top plan view of a package formed with a bulked sheet of FIGS. 1, 2 or 3.
Figure 9:
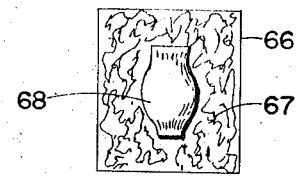
FIG. 9 is a diagrammatic section through a different package formed in a different manner from the bulked sheet of FIGS. 1, 2 or 3 than the package of FIG. 8.

Looking now at FIGS. 7, 8 and 9, variations in a method of packaging goods to protect them is shown. A roll 59 of a substantially flat sheet of material of plastic with a memory of a bulking variation in surface therein is placed on an unrolling stand 60 as shown in FIG. 7. The leading edge 61 of the roll 59 is then feed through an oven 62 and a cutter 63. Then for example if jar 64 is to be wrapped in the protective bulked material a length of the already bulked material is withdrawn through the cutter 63 and torn against a cutter blade (not shown) therein. Of course the cutter could be operated by a guillotine type action tripped by an operator's foot or by any other appropriate means as may be desired. The material is then wrapped about the jar as shown in FIG. 8 and adhesively sealed or heat sealed to itself as shown at 65. The goods or jar is thereby at least partially covered and protected by the sheet. As the leading edge 61 is pulled through the cutter 63 an additional length of material is pulled into the oven where it will be bulked or treated to bring about the substantial return of its remembered variations. By way of example, we have chosen to use a sheet of material 20, but, of course, other bulked patterned material could be used depending on the desired form. The sheet 20 that is used here is the one described in the first two paragraphs of this section of the specification and the oven temperature is accordingly set at approximately 190°F. Of course, the oven temperature may be varied depending on the rate at which the material is to be drawn through the oven. Intermediate rollers may be necessary between the oven and the cutter 63 to allow for air cooling of the bulk material under proper circumstance. Of course, it is possible to bulk the bulking material at any time before its use. For example a large stock of presized sheets can be bulked in one area of a packing house and then distributed to various other areas for use over a period of time as packaging requirements necessitate.

The package may take on other forms than the one shown in FIG. 7. A package may be formed in other manners, for example, in another preferred specie the sheeting 20 is removed directly from the roll through the cutter 63 without passing through the oven 62. The unbulked sheeting is sealed about the jar 64 prior to treatment and thereafter treated and bulked by placing the jar wrapped in the bulking material into an oven or a hot water bath. Of course, other heating means such as high intensity lamps could be used to treat the sheet to bring about the substantial return of the remembered variation.

In another preferred embodiment an article to be packaged, for example in a box, is cushioned by crumpling and/or inserting the bulked sheet material between it and the sides of a box to insulate it for shipment as shown in FIG. 9. In still another embodiment the sheet material is stuffed into the box prior to bulking and the box is then inserted into a treatment facility, such as an oven to bulk the material and more tightly secure the article to be packed protectively within the box. The end product of both of these procedures is shown in FIG. 9 which shows box 66, bulked material 67 and a vase 68 cushioned thereby.

Figure 10:
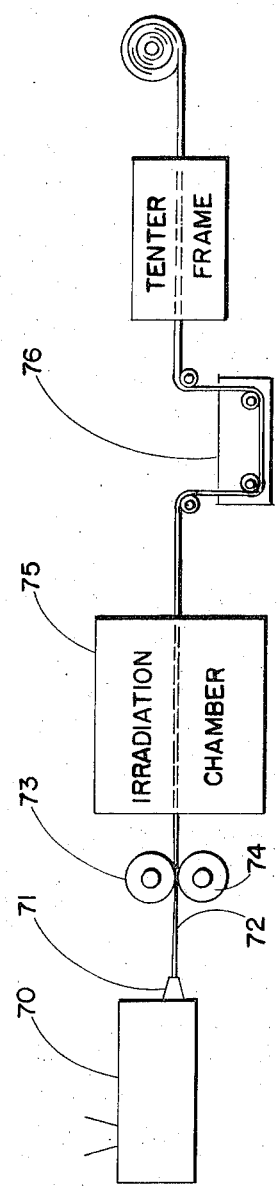
FIG. 10 is a diagrammatic illustration of a process for producing the bulking material of this invention.

Turning now to a description of a preferred manner of producing the bulking material of this invention in a substantially flat sheet form with a memory of a variation in surface therein, a conventional extruder 70 is shown in FIG. 10 with a sheeting die 71. A sheet of plastic, low density polyethylene 72 having a density of 917, a melt index of 2 and a melting point of 104°C. is continuously extruded from the die 71. The sheet is extruded at 350°F and is 30 mils thick. The sheet passes to the two cold embossing rolls 73 and 74 at substantially the 350°F extrusion temperature. The embossing rolls 73 and 74 are maintained at 70°F and as the sheet 72 passes between them it is pressed and both embossed and cooled below the plastic's softening temperature at the same time. Looking at FIGS. 4 and 5 it may be understood that the embossing rolls have complementary or oppositely offset configuration so that one roll will impinge upon the sheet on one side in a given area and the opposite roll will allow its opposite distortion in this same area. If sheet 72 is to have the patterned surface of sheet 20 of FIG. 1 then the rolls 73 and 74 are patterned accordingly. If the sheet is to be vacuum formed only one roll 73, 74 is needed. This roll would have the desired configuration or pattern formed on its surface and be supplied with a vacuum for drawing the sheet into the patterned configuration. If a vacuum forming roll is to be used it will generally be positioned a little further downstream so as to receive the sheet 72 at a lower temperature in the present instance at about 225°F. The roll would still desirably be operated at 70°F.

After the sheet is formed or patterned it is passed to the irradiation chamber 75 which has an MEV generator. The sheet is passed through the irradiation chamber at 15 ft. per minute and receives a 6 MA dose of 9 MR at ambient temperature. This cross-links the sheet and thereby provides its memory of the variation in surface. Other cross-linking means could be used. The important element here is that a memory of the variation in surface that is existent in the material be expeditiously set so that with subsequent elimination of the pattern to provide a substantially flat sheet of plastic this pattern will be all the same retained within the sheet itself. It has been found that the irradiation chamber is a most expeditious means of providing the cross-linking to the patterned plastic sheet. The patterned plastic sheet then passes from the irradiation chamber 74 to a thickness reducing means which includes a preconditioning heating means 76 which in FIG. 10 is a reservoir of water heated to 212°F and this adjusts the sheet temperature to the sheet's orientation temperature after which the sheet is transferred to a stretching means. A tenter frame stretches the sheet until it is unbulked or unpatterned to the intended extent. The sheet 72 is biaxially stretched on the tenter frame 16:1, 4:1 in each direction. The sheet is preferably stretched from 9:1 to 20:1 biaxially in the usual case. This yields a flattened sheet having a thickness of about 2 mils. Of course depending on the desired application other thickness may be produced. After orientation the sheet is maintained in its stretched, restrained condition until air cooled at ambient conditions. The sheet is then rolled into a compact form for storage in subsequent uses. Of course, it could be formed into sheets or even passed directly to a bulking facility at some other area if desired. This might be particularly true if the sheet is to be used to wrap the product prior to bulking as previously described in one specie.

In the usual instance in forming the sheets 51 and 52 of FIG. 6 the sheets would be only uniaxially oriented in the direction of the progression of the corrugations. The preferred uniaxial orientation is 3:1 to 6:1.

The sheets of this invention may in certain instances provide special cushioning effects by being laminated to non-patterned flat sheets or more usually thin bridging films that would form a web over the low areas on both sides of the patterned sheet covering the variations. This laminated film would usually also be oriented so that it would form a taut surface when the composite is treated to bulk it. The laminate could be formed in the same manner described for the laminate of FIG. 6.

While this invention has been presented as a packaging means it may in other species have other uses. For example the sheets could be placed between two objects or structural members in unbulked condition and upon bulking treatment they would force the members apart or hold them tightly apart. Or items such as throw away picnic plates might be made in accordance with our invention for storage as flat disk and reconstituting for later use in bulked form.

I claim:

1. A process for producing a bulk cushioning material comprising the steps of:
    a. producing a regular, repeating bulking pattern in a plastic sheet with a memory;
    b. heating said plastic sheet;
    c. stretching said sheet while it is heated until it is flattened thereby removing the bulking effect of said pattern;
    d. cooling said sheet; and, thereafter,
    e. heating said sheet to restore the pattern which had been formed therein.

2. The process of claim 1 wherein the step of producing a plastic sheet with a memory comprises:
    (a.1.) forming a pattern in a sheet of plastic material with a memory; and,
    (a.2.) cross-linking said sheet by irradiating same.

3. The process of claim 2 wherein said plastic material is polyethylene and the step of forming a pattern comprises:
    (a.1.A.) heating a polyethylene sheet to its softening temperature;
    (a.1.B.) forming a pattern in said sheet while it is softened; and, thereafter,
    (a.1.C.) cooling said sheet below its softening temperature; and the step of heating said sheet comprises:
    (b.1.A.) heating said irradiated polyethylene sheet to its orientation temperature.

4. The process of claim 1 wherein said flattened and cooled sheet is rolled into compact form and stored prior to being returned to its patterned surface.

5. The process of claim 1 wherein said plastic sheet with a memory having a pattern formed therein is produced by extruding a sheet of polyethylene, forming a pattern surface in said polyethylene sheet by passing the extruded sheet while still soft from its extrusion condition between cold embossing rolls and thereby embossing a pattern on said sheet, and cooling and irradiating said sheet; and, the heating and stretching of said sheet comprises heating the irradiated sheet to its orientation temperature by submersion in hot water and biaxially stretching said sheet in an ratio between 9:1 to 20:1 to flatten same.

* * * * *